T. H. Madison,
Belt Shifter.
N° 24,220. Patented May 31, 1859.
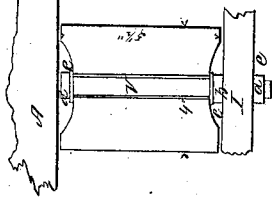
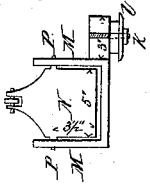
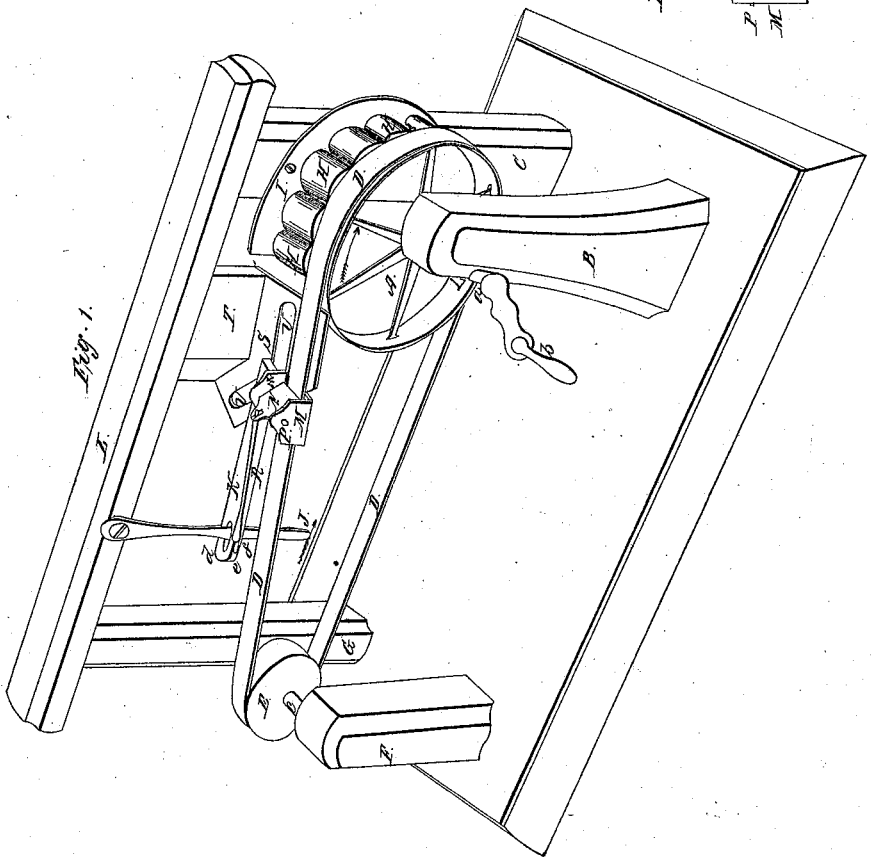
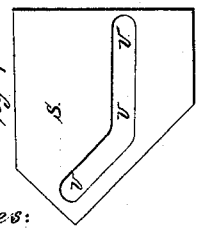
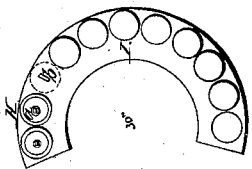
Witnesses:
John H. Jackson
Alvan H. Madison
Inventor:
T. H. Madison

UNITED STATES PATENT OFFICE.

TINDAL A. MADISON, OF TERRE HAUTE, INDIANA.

MODE OF CONNECTING AND DISCONNECTING MACHINERY BY MEANS OF A BELT.

Specification of Letters Patent No. 24,220, dated May 31, 1859.

*To all whom it may concern:*

Be it known that I, TINDAL A. MADISON, of Terre Haute, in Vigo county, in the State of Indiana, have invented a new and Improved Mode of Connecting and Disconnecting Machinery by Means of a Belt; and I do hereby declare that the following is a full and exact description thereof, reference being had to the accompanying drawings, and to the letters of reference marked thereon.

The nature of my invention consists in applying a shifting bar of peculiar construction to a belt, used for connecting machinery, in such way that the belt may be shifted by a motion of the bar, either from a driving pulley to a series of dead rollers or their equivalent suitably disposed along side, or vice versa. Shifting levers have been long in use, but they have been employed to shift the belt, not from the driving pulley, as in my invention, but from the leading pulley to a friction pulley along side and vice versa. In the old method the belt therefore remains always on the driving pulley, unless disconnected by the hand, and is constantly running at a great expense from wear and tear of bands and machinery, and loss of power. By my invention, I shift the belt off or on the driving pulley at pleasure by a simple motion, and the belt always remains at rest except when in actual use.

To enable others skilled in the art to make and use my invention, I will proceed to describe its construction and operation.

Figure 1 is a perspective drawing of my invention. A represents a driving pulley, *a* its shaft and *b* a crank attached thereto by means of which the driving pulley A may be made to revolve in the direction of its arrow. B and C are posts supporting the shaft *a*. D D D is a belt connecting the driving pulley A with the leading pulley E, and communicating motion to the leading, or to the friction pulley E when the driving pulley A revolves. F G are posts supporting the shaft C of the pulley E. I is a plate of wood or iron fastened to the post G, supporting a series of rollers H H H, partly seen in the drawing. The rollers H H H are attached to the plate I, each by a bolt or stud passing through its axes on which it is free to revolve. The rollers H H H are placed side by side, leaving a little space between, and are disposed in an arc of a circle (usually a little more than a semicircle) the same diameter with that of the driving pulley A. The series of rollers H H H (having reference to its contour as a whole) is placed concentric with the shaft *a* of the driving pulley A, and on one side of the driving pulley A, and but little distance therefrom. The series of rollers H H H are placed opposite, and corresponding to that part of the circumference of the driving pulley on which the belt D D D rests. (Instead of the series of dead rollers a dead pulley may be used turning on the shaft by means of a hollow shaft of its own.)

Fig. 2 represents a vertical section of one of the series of rollers shown at H H H Fig. 1. V Fig. 2 is a bolt or stud firmly attached to the plate I by the nuts *a* and *b* on either side of the plate I. H is a section of the roller. A cup shaped excavation is turned out at both ends around the axis to receive the nuts *b* and *d*. The nut *d* aided by the washer *c* confines the roller H in its place on the bolt V, and the nut *b*, aided by the washer *c*, keeps the roller H from contact with the plate I. A is a section of the driving pulley where it is opposite the free end of the roller H exhibiting the proper distance between the two.

Fig. 3 represents a front view of the plate I and rollers attached in a semicircular form. H is an end view of one of the rollers. The cup shaped excavation is seen at *a*, and within this the washer, nut and end of the stud. The excavation in the ends of the rollers may be dispensed with where the driving pulley is of iron, as in that case the end of the stud will come under the rim and not interfere.

J, Fig. 1, is a lever carrying the shifting bar with its accessories K, not by a close attachment but allowing a little play, by means of the slot *d*. The lever J is pivoted on the beam L, with a loose joint. The shifting bar K carries a box M M, consisting of a bottom and two sides. This is firmly attached to the bar K on one side, and its position is such in relation to the belt D, that the belt D passes over the bottom, parallel and nearly in contact therewith and between the sides M M. N is a gate or pawl N pivoted on the rod *p*, which passes perpendicularly through the box M M from side to side, the gate N being of nearly the same width of the box M M within which it plays. In the shifting bar K is a lateral slot e, through which a stud f passes, which is inserted into the lever J. Pivoted on the free extremity of the stud f, and confined to it by a nut thereon is the rod R connected with the gate or pawl N by a slot and rivet at the upper part of N. The bar K and box M M are supported by a guide plate S on which they slide—and which is attached to the beam L by means of the block T. The guide plate S contains a V shaped slot U U, having two branches, spreading at an angle of about 135°. A vertical or top view of the plate S and slot U is shown in Fig. 4. On the under side of the bar K Fig. 1, is pivoted and attached a friction roller h and of a diameter slightly less than the breadth of the slot U, within which it plays, and by means of which, it serves to guide the shifting bar K and its accessories in a plate having the same general direction as the slot U.

Fig. 5 represents an end view of the box M M of the shifting bar K, with the friction roller h. It also shows a front view of the gate or pawl N, and the attachment thereto of the connecting rod R, by means of the pivot i. The friction roller h turns on a stud k secured by nuts to the bar K. l is a guard and washer, under the friction roller h, which may extend under the plate S so as to prevent the friction roller from rising out of the slot U U. The stud k has a nut or head on the lower end by which the roller and washer are properly adjusted.

Having thus described the various parts of my invention, I will now describe them in their connection and mutual dependence.

When the driving pulley A is made to revolve in the direction of its arrow by power applied to the shaft a, and when the belt D D D is running thereon, and performing its function of communicating motion to the leading or friction pulley E, the proper position for the shifting bar K and box U is forward at the entrance end U of the guiding slot U U. The position of the lever J suspended like a pendulum from the beam L and attached in the manner described to the bar K is also forward in the direction of its arrow and out of its position of equilibrium. The lever J therefore tends to fall back under the influence of gravity, and it has sufficient weight to fall back through the intent of the slot d, carrying with it the stud f and rod R connected therewith and to raise the gate or pawl N connected with the rod R from contact with belt D D D. This is the position of rest of the shifting bar K and its accessories when the belt D D D is on the driving pulley A and running. The belt D D D then passes over the bottom of the box M M, and under the gate or pawl N without necessarily touching either. If it is now necessary to shift the belt D D D from the driving pulley A onto the series of dead rollers H H H, the lever J is thrown backward in the reverse direction of its arrow, and the shifting bar K and box M M are thereby carried backward and laterally, guided by the friction roller h working in the slot U U; until the friction roller h reaches the extremity U of the slot U U. The side M of the box M M bears on the edge of the belt D D D and guides it in the direction of the dead rollers H H H. The inertia of the pulley F, and machinery connected therewith is sufficient to run it over onto the dead rollers H H H before the friction pulley F stops. If it is now desired to shift the belt D D D from the dead rollers H H H onto the driving pulley A revolving in the direction of its arrow, the lever J is thrown forward. The first motion of the lever J carries it forward through the slot d until it brings up against the arm K, as seen in the drawing. The lever J carries forward with it in this motion the stud f and connecting rod R attached thereto and depresses the gate or pawl N down on the belt D D D so as to clamp it against the bottom of the box M M. The continued motion forward of the lever J then carries the shifting bar K with its box M M and the belt D D D clamped between the pawl N and the bottom of the box M M forward and laterally, and then forward alone, in the direction of the driving pulley A following the twofold direction of the slot U U from U to U. By means of this forward motion of the belt D D D combined with the lateral motion, I am enabled to shift it from the dead rollers to the pulley A while in motion. In order to run the belt D D D from a state of rest on to the driving pulley A in motion it is necessary to communicate to it as I have in my invention a forward as well as a lateral motion. As soon as the lever J has been thrown forward to the full extent of the stroke as just described and is released it drops back by its own weight through the extent of the slot f and connecting rod R it raises the gate or pawl N from the belt D D D which it had previously clamped and allows the belt D D D to run freely. The forward motion of the belt also carried by the driving pulley A helps to raise the gate and start the lever backward.

The weight of the gate or pawl N is often sufficient to insure its clamping the belt D D D in its forward motion dispensing with the connecting rod R, the stud f and the slot d the lever being then simply pivoted on the bar K. In this case the belt D D D is relieved from the clamp of the gate or pawl as soon as it is carried forward by the driving pulley A, and leaves the weight of the pawl resting on it while the belt is in motion. But the top of the gate N may be made to strike a pin projecting from the block T in such a position that it will encounter the top of the gate N and throw it up from the belt D D D just before the end of the stroke of the shifting bar K and the lever J. And a like arrangement at the back end of the slot U U' to throw the gate down again. The gate or pawl N being kept in place by its top being rounded and turning under a spring projecting from the side of the box M M and resting upon it.

I usually construct the parts peculiar to my invention of wood with the exception of the studs, nuts and washers, which I make of iron. But I do not confine myself to any special material. Neither do I confine myself to the precise arrangement described.

What I claim as my invention, and desire to secure by Letters Patent is—

1. The combination of the shifting bar K with the belt D D D, the driving pulley A and the series of dead rollers H H H or their equivalents, for the purposes described.

2. The combination of the shifting bar K and box M M with the gate or pawl N or their equivalents, for the purposes described.

3. The guide plate S with its slot U U in combination with the friction roller $h$, or their equivalents, for the purpose of giving both forward and lateral motion to the belt D D D when moved from a state of rest as described.

4. The series of dead rollers H H H for the purposes and arranged in the manner set forth.

5. The lever J in combination with the slots $d$ and $e$, the stud $f$ and connecting rod R for the purpose of operating the gate or pawl N in the manner described.

T. A. MADISON.

Witnesses:
 JOSEPH COOPER,
 LEONARD BARNEY.